Sept. 6, 1927.  1,641,913
W. M. WALKER
PLASTIC CONCRETE DELIVERY VEHICLE
Filed March 12, 1925   2 Sheets-Sheet 2

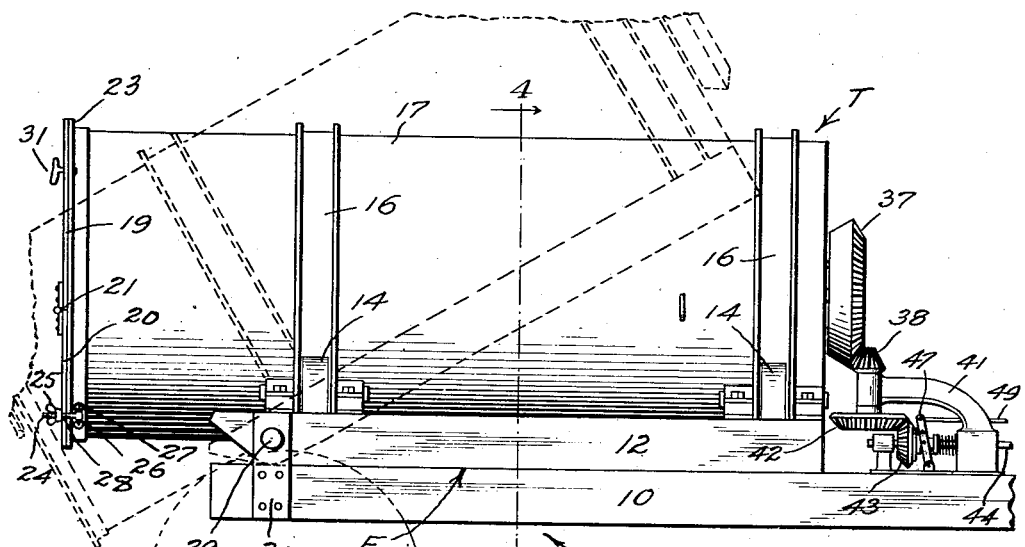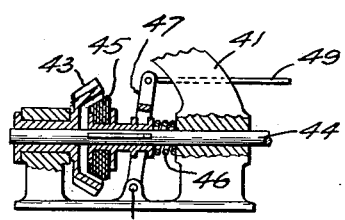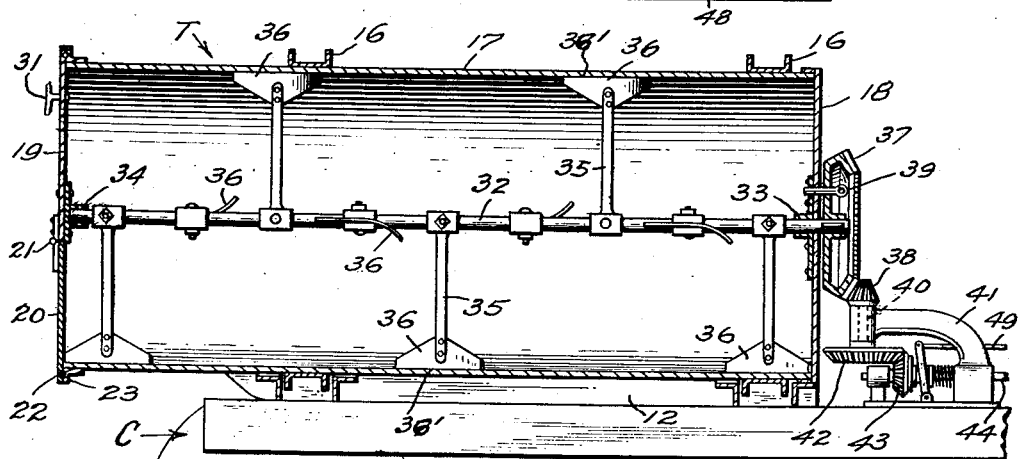

INVENTOR
William M. Walker
BY
Pierre Barnes
ATTORNEY

Patented Sept. 6, 1927.

1,641,913

UNITED STATES PATENT OFFICE.

WILLIAM M. WALKER, OF SEATTLE, WASHINGTON, ASSIGNOR OF ONE-HALF TO JOSEPH ERICKSON, OF SEATTLE, WASHINGTON.

PLASTIC-CONCRETE-DELIVERY VEHICLE.

Application filed March 12, 1925. Serial No. 14,940.

This invention relates to devices for conveying plastic concrete from a place where the same is mixed to distant places where the concrete is to be utilized in the construction of walls, sidewalks, etc.

The object of the present invention is the provision of a plastic concrete containing-tank mounted upon a wheeled vehicle, and means associated with such tank for stirring or agitating the concrete while the vehicle is at rest or in transit to retain the mass homogeneous and in a state ready to be employed in construction work.

More specific objects and advantages of the invention will be in part obvious and in part pointed out in the following specification.

The invention consists in the construction, novel arrangement and combination of parts hereinafter described and claimed.

In the accompanying drawings,—

Figure 3:
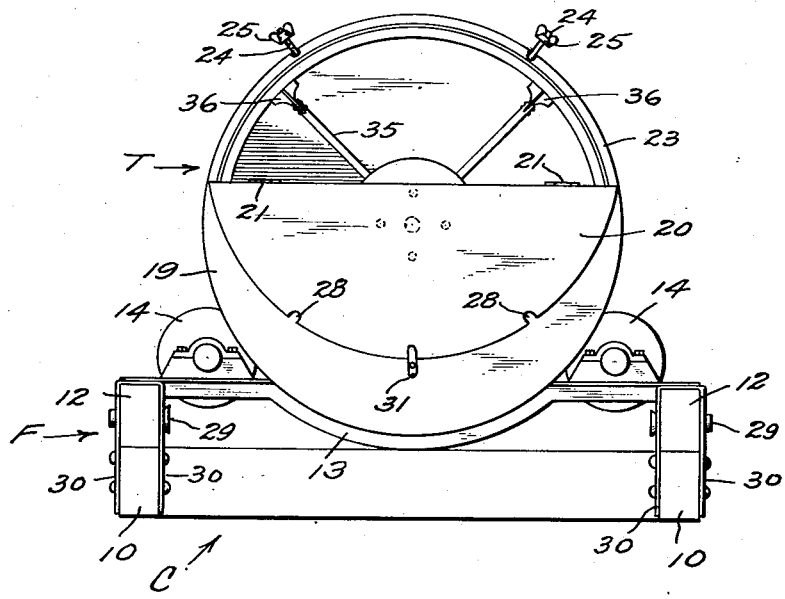
Figure 4:
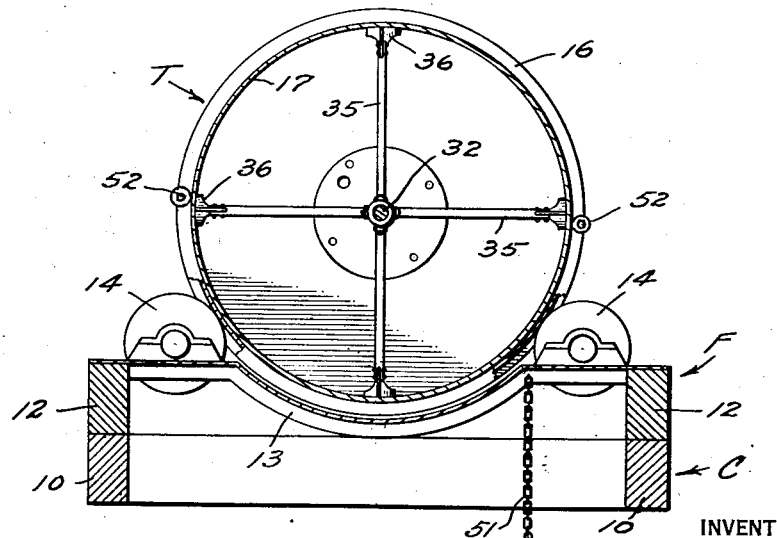

Figure 1 is a side elevation of the rear portion of a wheeled vehicle, shown somewhat diagrammatically, with the present invention applied thereto, illustrating in solid lines the tank in its concrete-carrying position, and in dotted lines the tank in its load-dumping position; Fig. 2 is a vertical longitudinal section of Fig. 1; Fig. 3 is a rear elevaton of the same, with the tank occupying a rotative position different from that in which it is represented in Figs. 1 and 2, and showing the door in its open position; Fig. 4 is a vertical transverse section on the line 4—4 of Fig. 1 viewed from the rear; and Fig. 5 is a vertical longitudinal section to an enlarged scale of portions of the driving mechanism illustrated in elevation in Figs. 1 and 2.

In said drawings the reference numerals 10 represent the side bars of the chassis C of a motor truck having traction wheels such as indicated by 11, said wheels being driven by any suitable power means, not shown. Mounted upon said chassis is a rigid frame F comprising, as shown, side bars 12 and transverse bars 13.

Rotatably mounted upon bearing rollers 14 provided upon said frame is a cylindrical tank T, said rollers operating in channel track rails 16 extending circumferentially around the peripheral wall 17 of the tank and constituting reinforcements therefor.

18 represents the front wall of the tank. The rear wall of the tank consists of an upper section 19 rigid with the peripheral wall of the tank, and a lower section 20 which is connected to the section 19 by means of hinges 21 so as to serve as a door, as it will be termed hereinafter, for the opening in the rear end of the tank.

The door 19 is closable against a packing or gasket, such as 22 for example, provided upon a flange element 23 of the tank wall 17. Said door is releasably secured in its closed position with respect to the tank opening as by means of locking bolts 24 and winged nuts 25, said bolts being pivotally connected as at 26 to attachments 27 of the tank structure and are swingable into and from slots 28 provided in the door.

The frame F is connected near its rear as by means of pivot bolts 29 extending through the frame bars 12 and companion plates 30 secured to the side bars of the chassis to permit the front end of the frame to be elevated to tilt the tank into load discharging position.

The elevating means above referred to is not illustrated as it forms no part of the present invention, any suitable known appliances such as used for operating vehicle dumping-bodies may be utilized.

A charge of material—plastic concrete—is supplied to the tank through the opening of the rear wall when the tank is in the rotary position in which it is illustrated in Fig. 3. The door is then closed and thus secured by means of said locking bolts and nuts, whereupon the material is carried by the vehicle to its destination. To discharge the load, the tank is turned about its axis into the position in which it is shown in Figs. 1 and 2, the door is unlocked and held as by means of a button 31 in its open position and, finally, the tank T, together with the frame F, is tilted into position whereat the load of concrete is discharged by gravitation.

Included in the invention are material stirring or agitating devices and also means for rotating the tank. Said stirring devices consist of a shaft 32 disposed axially of the tank and journaled in bearing boxes 33 and 34 secured to the front wall 18 and rear wall-section 19 of the tank; and arms 35 extending radially from said shaft and carrying at their outer ends paddle blades 36. These blades are each provided with an edge 36¹ in contact with the inner peripheral surface of the tank wall 17, or nearly so, in order to prevent the cement from adhering to such surface.

The blades 36 are, moreover, desirably curved (Fig. 2) longitudinally of the tank to impart movements to the concrete endwise of the tank during the revoluble movements of the blades with respect to the tank.

Rigidly mounted upon the end of shaft 32, in front of the tank, is a toothed bevel gear 37 which is engaged with a toothed bevel pinion 38 when the tank is in the load carrying position in which it is represented in Figs. 1 and 2. Means are provided, however, for coupling the gear 37 to the tank for rotating the latter; such coupling means, as shown in Fig. 2, consists of a pin 39 engageable in axially aligned holes provided in the gear and tank wall 18, respectively.

The pinion 38 is secured to a shaft 40 journaled in a bracket frame 41 secured to the chassis. Also secured to the shaft 40 is a toothed bevel gear 42 which is in continuous mesh with a second toothed pinion 43 mounted for relative rotation upon a shaft 44. The pinion 43 is coupled for rotative motion with its shaft 44 by means of a suitable friction clutch such, for example, as shown in Fig. 5.

In this clutch, the pinion 43 constitutes the driven member; the driving member, indicated by 45, being splined to the shaft 44 and is normally held in engaged relation with the pinion by means of a spring 46. 47 represents a forked lever fulcrummed at 48 and actuated as by means of a pull rod 49 for withdrawing the clutch member 45 from its engagement with member 43.

The clutch is disengaged prior to the loading and the discharging of the concrete into and from the tank. The clutch also serves to afford slippage of the stirring and agitating mechanism to prevent breakage in the latter or with respect to the driving means therefor in the event of a rock in the concrete aggregate becoming wedged between the tank wall 17 and one of the paddle blades 36.

The shaft 44 is rotated by power means (not shown) as, for example, the propeller shaft of the vehicle.

50 represents a hook connected by means of a chain 51 to the frame F and engageable with an eye-bolt 52 of the tank T for preventing the latter from turning with the paddles when operating in a comparatively dense concrete mixture.

According to my invention, the aforedescribed stirring and agitating means are operated continuously from the time the plastic concrete is supplied to the tank until it is about to be discharged from the tank at the place of using.

The concrete stirring and agitating means functions to retain the plastic concrete—cement, aggregate and water—in a thoroughly homogeneous mass, thus permitting the concrete to be conveyed for distances remote from the place when the concrete is mixed without liability of the concrete setting or the ingredients thereof separating into strata of different specific gravities, as occurs when concrete is transported in vehicles as hitherto.

As changes of details in the above described construction may be made without departing from the spirit of the invention or sacrificing its advantages, I do not wish to be understood as confining myself specifically thereto, except as limited by the scope of the following claims.

What I claim, is,—

1. In a wheeled vehicle, in combination, a cylindrical tank mounted thereon for both rotary and dumping movements, said tank having an opening in one of its end walls for the reception and discharge of material, a door for said opening, a material stirrer mounted for rotary motion within the tank, power transmission mechanism including a driving gear and a driven gear, and a means for releasably securing said driven gear with the tank whereby said mechanism will effect the rotation of the stirrer in unison with and independently of the tank selectively.

2. In a wheeled vehicle as defined in claim 1, wherein the tank opening is located in offset relation with the tank axis, and means for securing the tank in rotary positions to have said wall opening located above and below the tank axis, selectively.

3. The combination with the chassis of a wheeled vehicle, of a frame pivotally connected to an end of the chassis, a cylindrical tank having an opening in one end thereof, means provided upon said frame for rotatably supporting the tank thereon and also serving to prevent axial displacement of the latter with respect to the frame, a material stirrer mounted within the tank for rotary movement, said stirrer including a shaft and a toothed gear rigidly secured to one end thereof, means for releasably coupling said shaft to the tank against independent rotary movement, and power driven mechanism for actuating said gear, said mechanism including a toothed pinion adapted to be operatively engaged with and disengaged from said gear when the gear is moved downwardly and upwardly, respectively, with the tank and the frame.

Signed at Seattle, Washington, this 18th day of February, 1925.

WILLIAM M. WALKER.